A. P. SCHNEIDER.
GAME FORK.
APPLICATION FILED OCT. 1, 1910.
993,721.
Patented May 30, 1911.
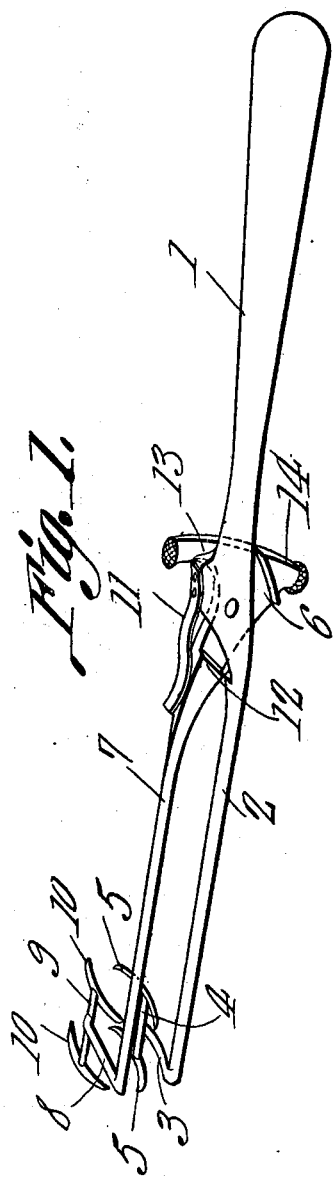
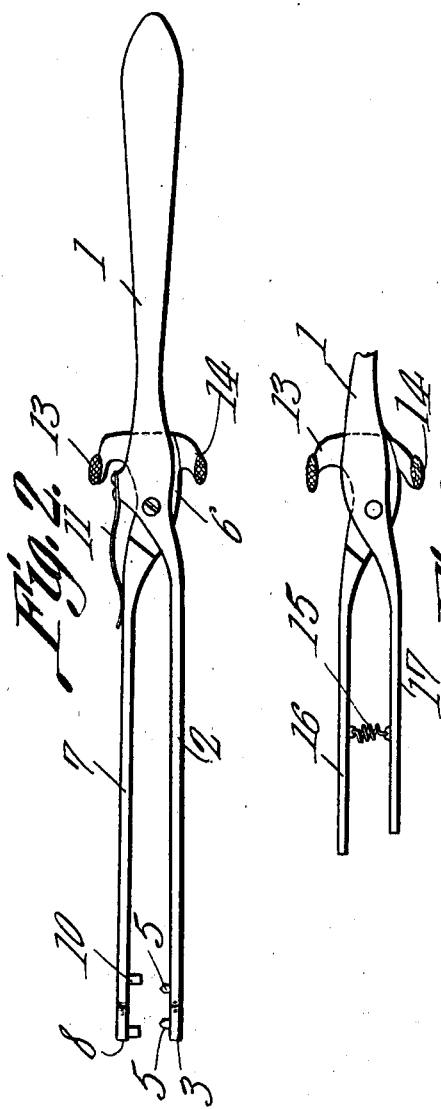
Witnesses
Adolph P. Schneider,
Inventor
by C. A. Snow & Co.
Attorneys

UNITED STATES PATENT OFFICE.

ADOLPH P. SCHNEIDER, OF BUFFALO, NEW YORK.

GAME-FORK.

993,721.  Specification of Letters Patent.  Patented May 30, 1911.

Application filed October 1, 1910. Serial No. 584,884.

*To all whom it may concern:*

Be it known that I, ADOLPH P. SCHNEIDER, a citizen of the United States, residing at Buffalo, in the county of Erie and State of New York, have invented a new and useful Game-Fork, of which the following is a specification.

This invention relates to forks especially designed for holding meat, bones, and the like and to be used by individuals principally in conveying food to the mouth.

One of the objects of the invention is to provide a light, durable and attractive device of this character which can be readily manipulated and which is adapted to automatically clamp upon the food so as to firmly hold it.

A further object is to provide means whereby a portion of the fork can be shifted so as to release the article engaged thereby, the entire operation of the fork being under the control of the hand grasping it.

With the foregoing and other objects in view the invention consists of certain novel details of construction and combinations of parts hereinafter more fully described and pointed out in the claim.

In the accompanying drawings the preferred form of the invention has been shown.

In said drawings:—Figure 1 is a perspective view of the fork. Fig. 2 is a side elevation. Fig. 3 is a side elevation of a portion of a modified form of fork.

Referring to the figures by characters of reference 1 designates the handle of the fork, there being a tine 2 extending from one end thereof and merging into an arm 3 which extends laterally from the tine, preferably at right angles thereto. A jaw is located at the free end of this arm and consists of a cross member 4 and oppositely extending prongs 5 located at the ends of said member and preferably bowed as shown. A head 6 is pivotally connected to the handle 1 at the inner end thereof and has a tine 7 extending from it and terminating in a laterally extending arm 8. This arm is parallel with the arm 3 and has a terminal jaw consisting of a cross member 9 and bowed prongs 10, these prongs being curved oppositely to the prongs 5 and adapted to lap them when the jaws are closed together. A spring 11 is secured to the handle 1 and bears on the tine 7 so as to hold the two jaws normally pressed toward each other, there being shoulders 12 upon the tine 7 and its head 6 and which are adapted to coöperate with the tine 2 and handle 1 for the purpose of limiting the relative movement of the two tines. Oppositely extending finger pieces 13 and 14 project from the head 6.

In using the device the tine 7 is swung away from the tine 2 by pressing the finger piece 13 toward the handle 1 or by pressing the finger piece 14 away from said handle, either of these operations being performed by means of one of the fingers or the thumb of the hand grasping the handle. Spring 11 will thus be placed under stress and the jaws moved apart. After the jaws have been placed at opposite sides of the article to be grasped, the finger piece is released and the spring 11 promptly returns tine 7 toward the tine 2 so as to cause the two jaws to clamp upon the article and firmly hold it. Instead of mounting the spring in the manner shown and described, a coiled spring 15 may be interposed between and connected to the tines 16 and 17, as illustrated in Fig. 3.

It will be seen that the fork herein described is very simple in construction and is particularly advantageous because it can be opened by the hand grasping the handle and it does not require any attention after the article has been gripped by the jaws, because said article is then held by the action of the spring.

Various changes can of course be made in the construction and arrangement of the parts without departing from the spirit or sacrificing any of the advantages of the invention as defined in the appended claim.

What is claimed is:—

A fork including a handle, a tine integral therewith, a second tine pivotally connected to the handle, a head integral with the pivoted tine, oppositely extending finger pieces upon the head and projecting beyond opposite portions of the handle, laterally extending arms upon the tines, said arms being substantially parallel, cross members integral with the arms, and bowed prongs carried by the terminal portions of said members, and yielding means for holding the tines and prongs normally in a predetermined relation.

In testimony that I claim the foregoing as my own, I have hereto affixed my signature in the presence of two witnesses.

ADOLPH P. SCHNEIDER.

Witnesses:
F. B. OCHSENREITER,
HUBERT D. LAWSON.